(12) United States Patent
Take et al.

(10) Patent No.: US 10,230,097 B2
(45) Date of Patent: Mar. 12, 2019

(54) NONAQUEOUS ELECTROLYTE SECONDARY BATTERY AND METHOD FOR MANUFACTURING SAME

(71) Applicant: NITTO DENKO CORPORATION, Ibaraki-shi, Osaka (JP)

(72) Inventors: Hiroyoshi Take, Ibaraki (JP); Atsuko Mizuike, Ibaraki (JP); Aimi Matsuura, Ibaraki (JP); Masao Abe, Ibaraki (JP)

(73) Assignee: NITTO DENKO CORPORATION, Ibaraki-shi, Osaka (JP)

( * ) Notice: Subject to any disclaimer, the term of this patent is extended or adjusted under 35 U.S.C. 154(b) by 383 days.

(21) Appl. No.: 14/653,909

(22) PCT Filed: Dec. 24, 2013

(86) PCT No.: PCT/JP2013/084465
§ 371 (c)(1),
(2) Date: Jun. 19, 2015

(87) PCT Pub. No.: WO2014/104004
PCT Pub. Date: Jul. 3, 2014

(65) Prior Publication Data
US 2015/0318540 A1 Nov. 5, 2015

(30) Foreign Application Priority Data

Dec. 27, 2012 (JP) .................................. 2012-285795

(51) Int. Cl.
| | | |
|---|---|---|
| *H01M 4/137* | (2010.01) | |
| *H01M 4/1399* | (2010.01) | |
| *H01M 10/0525* | (2010.01) | |
| *H01M 4/60* | (2006.01) | |
| *H01M 4/136* | (2010.01) | |
| *H01M 4/58* | (2010.01) | |
| *H01M 4/62* | (2006.01) | |
| *H01M 4/02* | (2006.01) | |

(52) U.S. Cl.
CPC ........... *H01M 4/137* (2013.01); *H01M 4/136* (2013.01); *H01M 4/1399* (2013.01); *H01M 4/5825* (2013.01); *H01M 4/608* (2013.01); *H01M 4/624* (2013.01); *H01M 10/0525* (2013.01); *H01M 2004/028* (2013.01); *Y10T 29/49117* (2015.01)

(58) Field of Classification Search
CPC .. H01M 4/137; H01M 4/5825; H01M 10/052; H01M 4/1399
See application file for complete search history.

(56) References Cited

U.S. PATENT DOCUMENTS

| | | | | |
|---|---|---|---|---|
| 4,544,615 A | * | 10/1985 | Shishikura | H01M 4/60 |
| | | | | 429/199 |
| 4,869,979 A | | 9/1989 | Ohtani et al. | |
| 4,939,050 A | * | 7/1990 | Toyosawa | H01M 2/1223 |
| | | | | 429/213 |
| 5,202,202 A | | 4/1993 | Nagai et al. | |
| 5,340,368 A | * | 8/1994 | Koksbang | H01M 4/04 |
| | | | | 29/623.5 |
| 6,071,489 A | * | 6/2000 | Sun | B82Y 30/00 |
| | | | | 423/594.4 |
| 2004/0110068 A1 | * | 6/2004 | Seki | H01M 2/021 |
| | | | | 429/326 |
| 2010/0302714 A1 | * | 12/2010 | Kobayakawa | C08L 65/00 |
| | | | | 361/529 |
| 2014/0220438 A1 | | 8/2014 | Abe et al. | |
| 2015/0325857 A1 | | 11/2015 | Take et al. | |

FOREIGN PATENT DOCUMENTS

| | | |
|---|---|---|
| CN | 101302341 A | 11/2008 |
| CN | 103765657 A | 4/2014 |
| CN | 104838533 A | 8/2015 |
| EP | 2 728 659 A1 | 5/2014 |
| EP | 2 913 879 A1 | 9/2015 |
| JP | 1-132052 A | 5/1989 |
| JP | 3-129679 A | 6/1991 |
| JP | 4-306560 A | 10/1992 |
| JP | 2001-266885 A | 9/2001 |
| JP | 2005-216607 A | 8/2005 |
| JP | 2010-044951 A | 2/2010 |

OTHER PUBLICATIONS

Komba S., et al. "Fast redox of composite electrode of nitroxide radical polymer and carbon with polyacrylate binder," Journal of Power Sources, vol. 195, No. 18 (Sep. 15, 2010).
Extended European Search Report dated Sep. 28, 2016, issued by the European Patent Office in corresponding application No. 13866580.7.
International Search Report of PCT/JP2013/084465, dated Feb. 18, 2014. [PCT/ISA/210].
Third Office Action dated Oct. 31, 2017, from the State Intellectual Property Office of People's Republic of China in counterpart Application No. 201380066915.6.
Fourth Office Action dated Jun. 1, 2018, from the State Intellectual Property Office of People's Republic of China in counterpart Application No. 201380066915.6.

* cited by examiner

Primary Examiner — Jonathan G Jelsma
(74) Attorney, Agent, or Firm — Sughrue Mion, PLLC

(57) ABSTRACT

A nonaqueous electrolyte secondary battery is provided, which includes a positive electrode, a negative electrode, a separator disposed between the positive electrode and negative electrode, and an electrolyte solution containing a supporting salt having ion conductivity, wherein the positive electrode comprises a composition containing components (a) and (b) below and satisfying a requirement ($\alpha$) below, and wherein the negative electrode contains metal lithium and at least one selected from materials capable of lithium ion insertion/desorption:
(a) an electrically conductive polymer;
(b) a lithium salt formed by substituting a part of a polyanionic acid with lithium; and
($\alpha$) a molar ratio of a lithium element content in the component (b) to a content of an element involved in a charge/discharge reaction in the component (a) is 0.1 to 1.0. Consequently, the nonaqueous electrolyte secondary battery has an excellent weight energy density and can reduce dependency on electrolyte solution amount.

5 Claims, No Drawings

NONAQUEOUS ELECTROLYTE SECONDARY BATTERY AND METHOD FOR MANUFACTURING SAME

CROSS REFERENCE TO RELATED APPLICATIONS

This application is a National Stage of International Application No. PCT/JP2013/084465 filed Dec. 24, 2013, claiming priority based on Japanese Patent Application No. 2012-285795, filed Dec. 27, 2012, the contents of all of which are incorporated herein by reference in their entirety.

TECHNICAL FIELD

The present invention relates to a nonaqueous electrolyte secondary battery and a method for manufacturing the same, and particularly to a nonaqueous electrolyte secondary battery that has an excellent weight energy density and low dependency on electrolyte solution amount, and a method for manufacturing the same.

BACKGROUND ART

With recent improvement and advancement of electronics technology for mobile PCs, mobile phones, personal digital assistants (PDAs), etc., secondary batteries and the like, which can be repeatedly charged and discharged, are widely used as power storage devices for these electronic apparatuses.

Of these secondary batteries, a lithium-ion secondary battery, which includes a positive electrode prepared by using a lithium-containing transition metal oxide such as lithium manganese oxide or lithium cobalt oxide as an electrode active material and a negative electrode prepared by using a carbonaceous material capable of lithium ion insertion/desorption, is in widespread use.

However, this lithium-ion secondary battery is a power storage device that generates electric energy through an electrochemical reaction, and the aforementioned lithium-ion battery using a lithium-containing transition metal oxide in a positive electrode has a critical problem of a lower power density because of its lower electrochemical reaction rate. The lithium-ion secondary battery still has room for improvement in capacity density per unit weight because of a large specific gravity of the lithium-containing transition metal oxide.

There is also known a nonaqueous electrolyte secondary battery in which an electrically conductive polymer, such as a polyaniline containing a dopant, is used as a positive electrode active material to improve the power density (see PLT1). In general, however, since the secondary battery employing the electrically conductive polymer as the positive electrode active material is of an anion migration type in which the polymer of the positive electrode is doped with an anion in a charge period and dedoped with the anion in a discharge period, the secondary battery is a so-called reserve type secondary battery in which an ion concentration in an electrolyte solution varies during charge/discharge. Accordingly, the nonaqueous electrolyte secondary battery employing the electrically conductive polymer as the positive electrode active material basically requires a large amount of an electrolyte solution, and therefore the nonaqueous electrolyte secondary battery has a problem that it is impossible to contribute to the size reduction of the battery.

In order to solve such a problem, a secondary battery is also proposed that is of a cation migration type and substantially free from change in the ion concentration in the electrolyte solution by using, for the positive electrode, an electrically conductive polymer containing a polymer anion such as polyvinyl sulfonate as a dopant (see PLT 2).

RELATED ART DOCUMENT

Patent Documents

PATENT DOCUMENT 1: JP-A-HEI3(1991)-129679
PATENT DOCUMENT 2: JP-A-HEI1(1989)-132052

SUMMARY OF INVENTION

However, the secondary battery of PLT 2 does not include lithium in the positive electrode material in advance. Therefore, even if the reaction occurring at the positive electrode is brought into a cation migration type by including the polymer anion as a dopant in the positive electrode, this battery results in a reduction of the lithium ion concentration in the electrolyte solution because lithium to be supplied from the positive electrode to the electrolyte solution is not contained in the positive electrode in an initial charge period. Accordingly, a secondary battery using the positive electrode as described above requires a large amount of an electrolyte solution in order to obtain a battery capacity, and consequently, the battery has a problem that an energy density per battery volume is low. That is, when the amount of the electrolyte solution involved in a charge/discharge reaction is great, the battery capacity is increased, but when the electrolyte solution amount is small, the battery capacity is decreased.

The present invention was made in view of such circumstances, and it is an object of the present invention to provide a nonaqueous electrolyte secondary battery that has an excellent weight energy density and low dependency on electrolyte solution amount, and a method for manufacturing the same.

According to a first aspect of the present invention, there is provided a nonaqueous electrolyte secondary battery, which includes a positive electrode, a negative electrode, a separator disposed between the positive electrode and the negative electrode, and an electrolyte solution containing a supporting salt having ionic conductivity, wherein the positive electrode is composed of a composition containing components (a) and (b) below and satisfying a requirement ($\alpha$) below, and the negative electrode contains metal lithium and at least one selected from materials capable of lithium ion insertion/desorption:

(a) an electrically conductive polymer;
(b) a lithium salt formed by substituting a part of a polyanionic acid with lithium; and
($\alpha$) a molar ratio of a lithium element content in the component (b) to a content of an element involved in a charge/discharge reaction in the component (a) is 0.1 to 1.0.

According to a second aspect of the present invention, there is provided a method for manufacturing the nonaqueous electrolyte secondary battery of the aforementioned first aspect of the present invention, the method including steps (I) to (III) below:

(I) preparing a positive electrode and a negative electrode, and disposing a separator between the positive electrode and the negative electrode to produce a stacked component including the positive electrode, the separator and the negative electrode;

(II) housing at least one of the stacked component in a battery container; and
(III) pouring an electrolyte solution into the battery container.

That is, the present inventors conducted earnest investigations in order to attain a nonaqueous electrolyte secondary battery that has an excellent weight energy density and low dependency on electrolyte solution amount, and hence can avoid a large increase in volume in forming a power storage element. During the process of the investigations, the present inventors conceived that lithium in the positive electrode is allowed to be desorbed from the positive electrode in a charge period and to be absorbed into the positive electrode in a discharge period by using, for the positive electrode material, the composition containing the electrically conductive polymer (a) and the lithium salt formed by substituting a part of a polyanionic acid with lithium (b). Thus, a ratio between the component (a) and the component (b) in the aforementioned composition is set so that the lithium element content in the lithium salt (b) to the content of the element involved in the charge/discharge reaction in the electrically conductive polymer (a) falls within a specific range. Consequently, they found that the lithium ion concentration in the electrolyte solution does not decrease and a higher battery capacity is provided, and therefore a desired object can be achieved.

As described above, the nonaqueous electrolyte secondary battery of the present invention includes a positive electrode, a negative electrode, a separator disposed between the positive electrode and the negative electrode, and an electrolyte solution containing a supporting salt having ionic conductivity, wherein the positive electrode comprises a composition containing an electrically conductive polymer (a) and a lithium salt formed by substituting a part of a polyanionic acid with lithium (b) and satisfying a specific requirement (α); and wherein the negative electrode contains metal lithium and a material capable of lithium ion insertion/desorption. Accordingly, the nonaqueous electrolyte secondary battery of the present invention exhibits reaction of a cation migration type in a charge/discharge reaction at its positive electrode and is free from reduction of a lithium ion concentration in the electrolyte solution caused by charge/discharge, and therefore the nonaqueous electrolyte secondary battery has an excellent weight energy density and low dependency on electrolyte solution amount, and can attain a desired battery capacity even when the electrolyte solution amount is small. From the above, it is possible to provide a nonaqueous electrolyte secondary battery having an excellent volume energy density.

Particularly, where the electrically conductive polymer (a) used for the positive electrode is at least one selected from polyaniline and polyaniline derivatives, a further improvement of battery performance such as a weight energy density is achieved.

Where the polyanionic acid used for the lithium salt (b) serving as a material of the positive electrode is at least one selected from the group consisting of polyacrylic acid, polymethacrylic acid, polyvinylbenzoic acid, polyallylbenzoic acid, polymethallylbenzoic acid, polymaleic acid, polyfumaric acid and polyglutamic acid, a further improvement of the weight energy density is achieved.

Where the method for manufacturing the nonaqueous electrolyte secondary battery includes the following steps (I) to (III), it is possible to efficiently provide a nonaqueous electrolyte secondary battery that has an excellent weight energy density and low dependency on electrolyte solution amount, as well as an excellent volume energy density as described above:

(I) preparing a positive electrode and a negative electrode, and disposing a separator between the positive electrode and the negative electrode to produce a stacked component including the positive electrode, the separator and the negative electrode;
(II) housing at least one of the stacked component in a battery container; and
(III) pouring an electrolyte solution into the battery container.

DESCRIPTION OF EMBODIMENTS

An embodiment of the present invention will hereinafter be described in detail, but the following description is an example of an embodiment of the present invention and the present invention is not limited to the following description.

The nonaqueous electrolyte secondary battery of the present invention includes a positive electrode, a negative electrode, a separator disposed between the positive electrode and the negative electrode, and an electrolyte solution containing a supporting salt having ionic conductivity, wherein the positive electrode comprises a composition containing components (a) and (b) below and satisfying a requirement (α) below; and wherein the negative electrode contains metal lithium and at least one selected from materials capable of lithium ion insertion/desorption:

(a) an electrically conductive polymer;
(b) a lithium salt formed by substituting a part of a polyanionic acid with lithium; and
(α) a molar ratio of a lithium element content in the component (b) to a content of an element involved in a charge/discharge reaction in the component (a) is 0.1 to 1.0.

The aforementioned members, materials to be used and the like will hereinafter be successively described.

<Positive Electrode>
[Electrically Conductive Polymer (a)]

As described above, the positive electrode for a nonaqueous electrolyte secondary battery of the present invention contains an electrically conductive polymer. The electrically conductive polymer in the present invention is herein defined as polymer that has an electrical conductivity variable due to insertion or desorption of ion species with respect to the polymer in order to compensate for change in electric charge to be generated or removed by an oxidation reaction or a reduction reaction occurring in a main chain of the polymer.

The polymer has a higher electrical conductivity in a doped state, and has a lower electrical conductivity in a dedoped state. Even if the electrically conductive polymer loses its electrical conductivity due to the oxidation reaction or the reduction reaction to be thereby electrically insulative (in the dedoped state), the polymer can reversibly have an electrical conductivity again due to the oxidation/reduction reaction. Therefore, in the present invention, the electrically insulative polymer in the dedoped state is also classified into the category of the electrically conductive polymer.

An example of the electrically conductive polymer, which is preferred as the positive electrode material of the nonaqueous electrolyte secondary battery of the present invention, is a polymer containing a dopant of a protonic acid anion selected from the group consisting of inorganic acid anions, aliphatic sulfonate anions, aromatic sulfonate anions, polymeric sulfonate anions and polyvinyl sulfate anions. Another preferred example of the electrically conductive polymer in the present invention is a polymer obtained in the dedoped state by dedoping the electrically conductive polymer described above.

Specific examples of the electrically conductive polymer include polyacetylene, polypyrrole, polyaniline, polythiophene, polyfuran, polyselenophene, polyisothianaphthene, polyphenylene sulfide, polyphenylene oxide, polyazulene, poly(3,4-ethylenedioxythiophene) and various derivatives thereof. Particularly, polyaniline, polyaniline derivatives, polypyrrole and polypyrrole derivatives each having a higher electrochemical capacity are preferably used, and polyaniline and polyaniline derivatives are further preferably used.

In the present invention, polyaniline described above refers to a polymer prepared by electrochemical polymerization or chemical oxidative polymerization of aniline, and the polyaniline derivatives refer to polymers prepared, for example, by electrochemical polymerization or chemical oxidative polymerization of aniline derivatives.

Examples of the aniline derivatives include aniline derivatives prepared by substituting aniline at positions other than the 4-position thereof with at least one substituent selected from alkyl groups, alkenyl groups, alkoxy groups, aryl groups, aryloxy groups, alkylaryl groups, arylalkyl groups and alkoxyalkyl groups. Preferred specific examples of the aniline derivatives include o-substituted anilines such as o-methylaniline, o-ethylaniline, o-phenylaniline, o-methoxyaniline and o-ethoxyaniline, and m-substituted anilines such as m-methylaniline, m-ethylaniline, m-methoxyaniline, m-ethoxyaniline and m-phenylaniline, which may be used either alone or in combination. In the present invention, though having a substituent at the 4-position, p-phenylaminoaniline is advantageously used as the aniline derivative because polyaniline can be provided by the oxidative polymerization of p-phenylaminoaniline.

In the present invention, "aniline or the aniline derivative" may be referred to simply as "aniline", and "at least one of the polyaniline and the polyaniline derivative" may be referred to simply as "polyaniline". Accordingly, even if a polymer for the electrically conductive polymer is prepared from an aniline derivative, the resulting polymer may be referred to as "electrically conductive polyaniline".

[Lithium Salt Formed by Substituting Part of Polyanionic Acid with Lithium (b)]

The positive electrode according to the nonaqueous electrolyte secondary battery of the present invention contains a lithium salt formed by substituting a part of a polyanionic acid with lithium (b) in addition to the electrically conductive polymer (a). The lithium salt formed by substituting a part of a polyanionic acid with lithium (b) may hereinafter be referred to as simply "lithium salt (b)". In the present invention, the polyanionic acid refers to a polymer having an anionic group. A part of or all the anionic group in the polyanionic acid molecule is substituted with lithium to form the aforementioned lithium salt (b). A substitution rate to lithium is particularly preferably 100%; however, the substitution rate may be low according to a situation, and it is preferably 40 to 100%.

The polyanionic acid used for the lithium salt (b) is preferably a polycarboxylic acid. In the present invention, the polycarboxylic acid refers to a polymer having a carboxyl group in its molecule. Particularly, polyacrylic acid, polymethacrylic acid, polyvinylbenzoic acid, polyallylbenzoic acid, polymethallylbenzoic acid, polymaleic acid, polyfumaric acid and polyglutamic acid are more preferred, and polyacrylic acid and polymethacrylic acid are moreover preferred. These polycarboxylic acids may be used either alone or in combination.

[Composition for Forming Positive Electrode]

As the composition to be used for forming the positive electrode according to the nonaqueous electrolyte secondary battery of the present invention, a composition containing the electrically conductive polymer (a) and the lithium salt (b) is used in which the molar ratio of the lithium element content in the lithium salt (b) to the content of the element involved in the charge/discharge reaction in the electrically conductive polymer (a) is 0.1 to 1.0. The molar ratio is preferably 0.3 to 0.6. That is, by setting the composition as described above, lithium is supplied from the positive electrode in a charge period, which avoids a reduction of the lithium ion concentration in the electrolyte solution. Therefore, a higher battery capacity is achieved, and it is possible to provide a nonaqueous electrolyte secondary battery that has an excellent weight energy density and low dependency on electrolyte solution amount, and hence can avoid a large increase in volume in forming a power storage element.

The element involved in the charge/discharge reaction in the electrically conductive polymer (a) in the aforementioned requirement refers to an element in which electric charge quantity is greatly changed when the electrically conductive polymer of the positive electrode initiates the charge/discharge reaction. For example, the element is a nitrogen atom in polyaniline and derivatives thereof. The element is a sulfur atom in polythiophene.

Accordingly, in the case of the polyaniline, when lithium (Li) is contained in an amount of 0.1 mol based on 1 mol of a nitrogen atom (N) in the polyaniline, the molar ratio (Li/N ratio) of lithium (Li) to the nitrogen atom (N) in the polyaniline is 0.1.

In the composition to be used for forming the positive electrode according to the nonaqueous electrolyte secondary battery of the present invention, the lithium salt (b) is generally used in an amount of 1 to 100 parts by weight, preferably 2 to 70 parts by weight, and most preferably 5 to 40 parts by weight, based on 100 parts by weight of the electrically conductive polymer (a). That is, the reason is that if the amount of the lithium salt (b) is excessively small with respect to the electrically conductive polymer (a), it will be impossible to obtain a nonaqueous electrolyte secondary battery having an excellent weight energy density. In contrast, if the amount of the lithium salt (b) is excessively great, it will be impossible to obtain a nonaqueous electrolyte secondary battery having a higher energy density in considering the entire battery weight by an increase of the positive electrode weight due to an increase of a weight of a member other than the positive electrode active material.

To the above composition, a conductive agent, a binder and the like are added as required together with the aforementioned components (a) and (b).

The conductive agent is desirably an electrically conductive material which has a higher electrical conductivity, and is effective for reducing the electrical resistance between the active materials of the battery and free from change in its properties due to application of a potential in battery discharge. Generally, usable examples of the conductive agent include electrically conductive carbon blacks such as acetylene black and Ketjen black, and fibrous carbon materials such as carbon fibers and carbon nanotubes.

The amount of the conductive agent is preferably 1 to 30 parts by weight, more preferably 4 to 20 parts by weight, and particularly preferably 8 to 18 parts by weight, based on 100 parts by weight of the electrically conductive polymer. If the amount of the conductive agent to be blended falls within this range, the positive electrode can be prepared without having abnormality of the shape or characteristics of the active material, and rate characteristics can be effectively improved.

As the binder other than the lithium salt (b) described above, polyvinylidene fluoride or the like, for example, may be used.

[Outer Shape of Positive Electrode]

The positive electrode according to the nonaqueous electrolyte secondary battery of the present invention is composed of the aforementioned composition for forming a positive electrode, and preferably formed in a porous sheet. In general, the positive electrode has a thickness of preferably 1 to 500 μm, more preferably 10 to 300 μm.

The thickness of the positive electrode is measured by means of a dial gage (manufactured by Ozaki Mfg. Co., Ltd.), which is a flat plate including a distal portion having a diameter of 5 mm. The measurement is performed at ten points on a surface of the electrode, and the measurement values are averaged. Where the positive electrode (porous layer) is provided on a current collector to be combined with the current collector, the thickness of the combined product is measured in the aforementioned manner, and the measurement values are averaged. Then, the thickness of the positive electrode is determined by subtracting the thickness of the current collector from the average thickness of the combined product.

[Production of Positive Electrode]

The positive electrode according to the nonaqueous electrolyte secondary battery of the present invention is produced, for example, in the following manner. For example, the aforementioned lithium salt (b) is dissolved or dispersed in water, and the electrically conductive polymer (a) powder and, as required, a conductive agent such as electrically conductive carbon black are added to and sufficiently dispersed in the resulting solution or dispersion to prepare a paste having a solution viscosity of about 0.1 to about 50 Pa·s. The paste is applied on a current collector, and then water is vaporized from the paste, whereby an electrode can be produced as a composite product (porous sheet) having a positive electrode active material-containing layer containing the electrically conductive polymer (a), the lithium salt (b), and the conductive agent as required on the current collector.

<Negative Electrode>

The negative electrode according to the nonaqueous electrolyte secondary battery of the present invention is formed of a material containing metal lithium and at least one selected from materials capable of lithium ions insertion/desorption. As the "materials capable of lithium ions insertion/desorption", a publicly known carbonaceous material, which is used as a negative electrode active material of a lithium-ion secondary battery, can be used. Specific Examples of the negative electrode active material include calcined product of coke, pitch, phenolic resins, polyimides and cellulose; artificial graphite; and natural graphite.

<Current Collector>

Exemplary materials for the positive electrode current collector and the negative electrode current collector include metal foils and meshes such as of nickel, aluminum, stainless steel and copper. The positive electrode current collector and the negative electrode current collector may be formed of the same material or may be formed of different materials.

<Electrolyte Solution>

As an electrolyte salt for the electrolyte solution to be used in the nonaqueous electrolyte secondary battery of the present invention, for example, lithium hexafluorophosphate, lithium tetrafluoroborate, lithium perchlorate or the like is suitably used.

Examples of the solvent to be used in the electrolyte solution include nonaqueous solvents, i.e., organic solvents, such as carbonates, nitriles, amides and ethers. Specific examples of the organic solvents may include ethylene carbonate, propylene carbonate, butylene carbonate, dimethyl carbonate, diethyl carbonate, ethyl methyl carbonate, acetonitrile, propionitrile, N,N'-dimethylacetamide, N-methyl-2-pyrrolidone, dimethoxyethane, diethoxyethane and γ-butyrolactone, which may be used either alone or in combination.

As the content of the electrolyte in the electrolyte solution, an amount commonly used as an electrolyte content of the nonaqueous electrolyte secondary battery is employed. That is, the electrolyte in the electrolyte solution is generally used in a concentration range of 0.1 to 2.5 mol/L, preferably 0.5 to 1.5 mol/L in the electrolyte solution. If the content of the electrolyte is excessively low, it will be impossible to obtain a nonaqueous electrolyte secondary battery having an excellent weight energy density, whereas, if the content of the electrolyte is excessively high, it will be also impossible to obtain a nonaqueous electrolyte secondary battery having an excellent weight energy density since ion insertion/desorption does not function well.

<Separator>

When a separator is used in the nonaqueous electrolyte secondary battery of the present invention, the separator may be an insulative porous sheet which is capable of preventing an electrical short circuit between the positive electrode and the negative electrode disposed in opposed relation with the separator interposed therebetween; electrochemically stable; and has a higher ionic permeability and a certain mechanical strength. Therefore, for example, paper, nonwoven fabric and porous films made of a resin such as polypropylene, polyethylene or polyimide are preferably used, and these materials may be used either alone or in combination.

<Method for Manufacturing Nonaqueous Electrolyte Secondary Battery>

A method for manufacturing the nonaqueous electrolyte secondary battery of the present invention using the aforementioned materials includes the following steps (I) to (III). The manufacturing method will hereinafter be described in detail.

(I) Preparing a positive electrode and a negative electrode, and disposing a separator between the positive electrode and the negative electrode to produce a stacked component including the positive electrode, the separator and the negative electrode.

(II) Housing at least one of the stacked component in a battery container.

(III) Pouring an electrolyte solution into the battery container.

Specifically, a positive electrode, a separator and a negative electrode are stacked so as to dispose the separator between the positive electrode and the negative electrode to produce a stacked component. Then, the stacked component is put in a battery container such as an aluminum laminate package, and dried in vacuum. Then, an electrolyte solution is poured into the vacuum dried battery container. Finally, the package serving as a battery container is sealed, whereby the nonaqueous electrolyte secondary battery of the present invention is completed.

<Nonaqueous Electrolyte Secondary Battery>

Besides the laminate cell, the nonaqueous electrolyte secondary battery of the present invention may be shaped in various forms such as a film form, a sheet form, a square form, a cylindrical form and a button form.

EXAMPLES

Inventive examples will hereinafter be described in conjunction with comparative examples. However, the present invention is not limited to these examples without departing from the gist of the invention.

First, the following materials and constituent members were prepared and produced before the production of nonaqueous electrolyte secondary batteries according to the inventive examples and the comparative examples.

[Preparation of Electrically Conductive Polymer]

As the electrically conductive polymer, powder of an electrically conductive polyaniline containing hydrochloric acid as a dopant was prepared in the following manner.

That is, first, 38.0 g (0.375 mol) of a hydrochloric acid aqueous solution (special grade reagent manufactured by Wako Pure Chemical Industries, Ltd.) having a concentration of 36 wt % was added to 95 g of ion-exchanged water contained in a 300-mL volume glass beaker. Then, 10.0 g (0.107 mol) of aniline was added to the resulting solution, while the solution was stirred by a magnetic stirrer. Immediately after the addition of aniline to the hydrochloric acid aqueous solution, aniline was dispersed in an oily droplet form in the hydrochloric acid aqueous solution, and then dissolved in water in several minutes to provide a homogeneous transparent aniline aqueous solution. The aniline aqueous solution thus provided was cooled to −4° C. or lower with the use of a refrigerant bath.

Then, 70.0 g (0.107 mol) of ammonium peroxodisulfate (Grade-1 reagent manufactured by Wako Pure Chemical Industries, Ltd.) having a concentration 35 wt % was added as an oxidizing agent little by little to the aniline aqueous solution, while the mixture in the beaker was kept at a temperature of not higher than 10° C. Immediately after the oxidizing agent was thus added to the aniline aqueous solution, the color of the aniline aqueous solution turned dark green. Thereafter, the solution was continuously stirred, whereby generation of a dark green solid began.

After the oxidizing agent was added in 60 minutes in this manner, the resulting reaction mixture containing the reaction product thus generated was cooled, and further stirred for 100 minutes. Thereafter, the resulting solid was suction-filtered through No. 2 filter paper (manufactured by ADVANTEC Corporation) with the use of a Buchner funnel and a suction bottle to provide powder. The powder was washed in an about 2 mol/dm$^3$ hydrochloric acid aqueous solution with stirring by means of the magnetic stirrer, then washed in methanol several times with stirring, and filtrated under reduced pressure. The resulting powder was dried in vacuum at a room temperature (25° C.) for 10 hours. Thus, 11.8 g of an electrically conductive polyaniline (electrically conductive polymer) containing hydrochloric acid as a dopant was provided, which was bright green powder.

(Electrical Conductivity of Electrically Conductive Polymer)

After 130 mg of the electrically conductive polyaniline powder was milled in an agate mortar, the resulting powder was compacted into an electrically conductive polyaniline disk having a diameter of 13 mm and a thickness of 720 μm in vacuum at a pressure of 300 MPa for 10 minutes by means of a KBr tablet forming machine for infrared spectrum measurement. The disk had an electrical conductivity of 4.8 S/cm as measured by Van der Pauw's four-point electrical conductivity measurement method.

(Preparation of Electrically Conductive Polymer in Dedoped State)

The electrically conductive polyaniline powder provided in the doped state in the aforementioned manner was put in a 2 mol/dm$^3$ sodium hydroxide aqueous solution, and stirred in a 3-L separable flask for 30 minutes. Thus, the electrically conductive polyaniline powder doped with the hydrochloric acid was dedoped through a neutralization reaction. The dedoped polyaniline was washed with water until a filtrate became neutral. Then, the dedoped polyaniline was washed in acetone with stirring, and filtered under reduced pressure through No. 2 filter paper with the use of a Buchner funnel and a suction bottle. Thus, dedoped polyaniline powder was provided on the No. 2 filter paper. The resulting powder was dried in vacuum at a room temperature for 10 hours, whereby brown polyaniline powder in the dedoped state was provided.

(Preparation of Electrically Conductive Polymer in Reduced-Dedoped State)

Next, the polyaniline power in the dedoped state was put in an aqueous solution of phenylhydrazine in methanol, and reduced for 30 minutes with stirring. Due to the reduction, the color of the polyaniline powder turned from brown to gray. After the reaction, the resulting polyaniline powder was washed with methanol and then with acetone, filtered, and dried in vacuum at a room temperature. Thus, polyaniline in a reduced-dedoped state was provided.

(Electrical Conductivity of Electrically Conductive Polymer in Reduced-Dedoped State)

After 130 mg of the polyaniline powder in the reduced-dedoped state was milled in an agate mortar, the resulting powder was compacted into a polyaniline disk in a reduced-dedoped state having a diameter of 13 mm and a thickness of 720 μm in vacuum at a pressure of 75 MPa for 10 minutes by means of a KBr tablet forming machine for infrared spectrum measurement. The disk had an electrical conductivity of $1.0 \times 10^{-5}$ S/cm as measured by Van der Pauw's four-point electrical conductivity measurement method. This means that the polyaniline compound was an active material compound having an electrical conductivity variable by ion insertion/desorption.

(Preparation of Aqueous Solution of Lithium Salt of Polyacrylic Acid)

To 175.38 g of ion-exchanged water, 18.48 g of polyacrylic acid (manufactured by Wako Pure Chemical Industries, Ltd., and having a weight average molecular weight of 1,000,000) was added, and the resulting mixture was left on overnight to be swelled. Thereafter, the swollen mixture was ultrasonically treated for 1 minute by means of an ultrasonic homogenizer to be dissolved, whereby 193.86 g of a uniform and viscous polyacrylic acid aqueous solution was provided. Then, 6.14 g of lithium hydroxide powder, which is equivalent to an amount required for converting whole of carboxyl group portions of polyacrylic acid to lithium salt, was added to 193.86 g of the resulting polyacrylic acid aqueous solution to prepare 200 g of an aqueous solution of lithium salt of polyacrylic acid (concentration 10 wt %). To the aqueous solution, 225.5 g of ion-exchanged water was further added to adjust its concentration to 4.7 wt %.

(Production of Positive Electrode (Positive Electrode I) Containing Polyanionic Acid with Use of Polyaniline Powder)

After 4 g of the polyaniline powder in the reduced-dedoped state and 0.43 g of electrically conductive carbon black (DENKA BLACK manufactured by Denki Kagaku Kogyo K.K.) powder were mixed, the mixture was added to 7.29 g of the aqueous solution of lithium salt of polyacrylic acid having a concentration of 4.7 wt %, and the resulting mixture was adequately kneaded by a spatula. Then, 13.96 g of ion-exchanged water was further added thereto, and the resulting mixture was ultrasonically treated for 1 minute by an ultrasonic homogenizer, and then the mixture was subjected to mild dispersion by applying a high shear force with the use of a thin-film spin system high-speed mixer (FILMIX MODEL 40-40 manufactured by Primix Corporation) to provide a fluid paste. The paste was defoamed by means of a vacuum suction bell jar and a rotary pump.

The defoamed paste was applied at a coating rate of 10 mm/sec onto an etched aluminum foil for an electric double layer capacitor (30CB manufactured by Hohsen Corporation) with the use of a desktop automatic coater (manufactured by Tester Sangyo Co., Ltd.) while the coating thickness was adjusted to 360 µm by a doctor blade applicator equipped with a micrometer. Then, the resulting coating was left standing at a room temperature for 45 minutes, and dried on a hot plate at a temperature of 100° C. to produce a polyaniline sheet electrode (positive electrode I) containing a polycarboxylic acid. This electrode contains lithium (Li) in an amount of 0.1 mol based on 1 mol of a nitrogen atom (N) in the polyaniline. That is, the molar ratio (Li/N ratio) of lithium (Li) to the nitrogen atom (N) in the polyaniline is 0.1.

(Production of Positive Electrodes (Positive Electrodes II to VII) Having Different Molar Ratio of Lithium to Nitrogen Atom in Polyaniline and Containing Polyanionic Acid)

The amount of each material used in producing the aforementioned positive electrode I was changed to a value shown in Table 1 below to set the Li/N ratio as shown in Table 1 below. Positive electrodes II to VII were produced in the same manner as in the positive electrode I except for the aforementioned conditions.

TABLE 1

|  | Polyaniline Powder [g] | Carbon Black [g] | Aqueous Solution of Lithium Salt of Polyacrylate Having Concentration of 4.7 wt % [g] | Ion-Exchanged Water [g] | Li/N Ratio |
| --- | --- | --- | --- | --- | --- |
| Positive Electrode I | 4 | 0.43 | 7.29 | 13.96 | 0.1 |
| Positive Electrode II | 3.97 | 0.46 | 14.47 | 13.87 | 0.2 |
| Positive Electrode III | 2.49 | 0.31 | 13.63 | 5.93 | 0.3 |
| Positive Electrode IV | 2.03 | 0.27 | 14.82 | 5.1 | 0.4 |
| Positive Electrode V | 1.49 | 0.21 | 13.54 | 2.99 | 0.5 |
| Positive Electrode VI | 1.34 | 0.2 | 14.6 | 0.96 | 0.6 |
| Positive Electrode VII | 1.33 | 0.21 | 16.93 | 0.2 | 0.7 |

Example 1

Production of Laminate Cell

A sheet of the positive electrode I was cut into a size of 35 mm×27 mm, and a part of an active material layer (polyaniline sheet portion) was removed so that the active material layer had an area of 27 mm×27 mm to produce a positive electrode having a portion of the sheet from which the active material layer had been removed was a location for attachment of a tab electrode for current extraction. The positive electrode was dried in vacuum at 80° C. for 2 hours in a vacuum dryer.

As a negative electrode, metal lithium (manufactured by Honjo Metal Co., Ltd., and having a thickness of 50 µm) was press-bonded to a stainless steel mesh for use. The size of a negative electrode active material layer (metal lithium layer portion) was set to 29 mm×29 mm, which was greater than that of the positive electrode active material layer.

As a separator, a nonwoven fabric (TF40-50 manufactured by NIPPON KODOSHI CORPORATION, having a thickness of 50 µm and a porosity of 70%) was used. The separator was dried in vacuum at 100° C. for 5 hours.

A solution, which was formed by dissolving $LiPF_6$ in a concentration of 1 mol/L in a solvent containing ethylene carbonate and dimethyl carbonate at a volume ratio of 1:1, was used as an electrolyte solution.

Next, a stacked component was assembled using the positive electrode, the negative electrode and the separator in a glove box in which the dew point of the atmosphere was −90° C. Specifically, the positive electrode, the separators and the negative electrode were stacked so as to dispose three sheets of the separators between the positive electrode and the negative electrode to provide a stacked component. After the stacked component was put in an aluminum laminate package, a periphery of the package was sealed by a laminator with one location of the periphery being left as an opening, and the electrolyte solution was poured in the package through the opening. Finally, the package was sealed, whereby a laminate cell (nonaqueous electrolyte secondary battery) was produced.

Examples 2 to 14

The kinds of the positive electrodes (positive electrodes I to VII described in Table 1 above), and the kind, number of sheets and drying conditions of the separator were changed to those shown in Table 2 below. Laminate cells (nonaqueous electrolyte secondary batteries) were produced in the same manner as in Example 1 except for the aforementioned conditions. A polypropylene porous membrane (CELGARD 2400 manufactured by Celgard Co., Ltd., having a thickness of 25 μm, a porosity of 38% and an air permeability of 620 sec/100 cm$^3$) was used as a polypropylene porous membrane shown in Table 2 below.

by a spatula. The kneaded mixture was ultrasonically treated for 1 minute by an ultrasonic homogenizer, and then the mixture was subjected to mild dispersion by applying a high shear force with the use of a thin-film spin system high-speed mixer (FILMIX MODEL 40-40 manufactured by Primix Corporation) to provide a fluid paste. The paste was defoamed by means of a vacuum suction bell jar and a rotary pump. The defoamed paste was applied at a coating rate of 10 mm/sec onto an etched aluminum foil for an electric double layer capacitor (30CB manufactured by Hohsen Corporation) with the use of a desktop automatic coater (manufactured by Tester Sangyo Co., Ltd.) while the coating thickness was adjusted to 360 μm by a doctor blade applicator equipped with a micrometer. Then, the resulting coating was left standing at a room temperature for 45 minutes, and dried on a hot plate at a temperature of 100° C. to produce a polyaniline sheet electrode (positive electrode VIII).

TABLE 2

|  | Positive Electrode | | Separator | | |
|---|---|---|---|---|---|
|  | Kind | Li/N Ratio | Kind | Number of Sheets | Drying Conditions |
| Example 1 | I | 0.1 | nonwoven fabric | 3 | 100° C. for 5 hours |
| Example 2 | I | 0.1 | polypropylene porous membrane | 2 | 80° C. for 2 hours |
| Example 3 | II | 0.2 | nonwoven fabric | 3 | 100° C. for 5 hours |
| Example 4 | II | 0.2 | polypropylene porous membrane | 2 | 80° C. for 2 hours |
| Example 5 | III | 0.3 | nonwoven fabric | 3 | 100° C. for 5 hours |
| Example 6 | III | 0.3 | polypropylene porous membrane | 2 | 80° C. for 2 hours |
| Example 7 | IV | 0.4 | nonwoven fabric | 3 | 100° C. for 5 hours |
| Example 8 | IV | 0.4 | polypropylene porous membrane | 2 | 80° C. for 2 hours |
| Example 9 | V | 0.5 | nonwoven fabric | 3 | 100° C. for 5 hours |
| Example 10 | V | 0.5 | polypropylene porous membrane | 2 | 80° C. for 2 hours |
| Example 11 | VI | 0.6 | nonwoven fabric | 3 | 100° C. for 5 hours |
| Example 12 | VI | 0.6 | polypropylene porous membrane | 2 | 80° C. for 2 hours |
| Example 13 | VII | 0.7 | nonwoven fabric | 3 | 100° C. for 5 hours |
| Example 14 | VII | 0.7 | polypropylene porous membrane | 2 | 80° C. for 2 hours |

Comparative Example 1

The positive electrode was changed to a positive electrode VIII produced in the following manner. A laminate cell (nonaqueous electrolyte secondary battery) was produced in the same manner as in Example 1 except for the aforementioned condition.
<Production of Positive Electrode VIII>
A binder solution was produced by mixing 1.125 g of a styrene-butadiene rubber (SBR) emulsion (TRD2001 manufactured by JSR Corporation) having a concentration of 48 wt % with 6.54 g of a polyvinyl pyrrolidone (PVP) aqueous solution (K-90W manufactured by NIPPON SHOKUBAI CO., LTD.) having a concentration of 19.8 wt %, and adding thereto 1.5 g of ion-exchanged water. Then, after 8 g of the polyaniline powder in the reduced-dedoped state and 1 g of electrically conductive carbon black (DENKA BLACK manufactured by Denki Kagaku Kogyo K.K.) powder were mixed, the produced binder solution above was added to the mixture, 13.2 g of ion-exchanged water was further added thereto, and the resulting mixture was adequately kneaded Comparative Example 2

Two sheets of polypropylene porous membranes (CELGARD 2400 manufactured by Celgard Co., Ltd., having a thickness of 25 μm, a porosity of 38% and an air permeability of 620 sec/100 cm$^3$) were used as the separator, and the membranes were dried in vacuum under the condition of 80° C. for 2 hours. A laminate cell (nonaqueous electrolyte secondary battery) was prepared in the same manner as in Comparative Example 1 except for the aforementioned condition.

Comparative Example 3

The positive electrode was changed to a positive electrode XI produced in the following manner. A laminate cell (nonaqueous electrolyte secondary battery) was produced in the same manner as in Example 1 except for the aforementioned condition.

<Production of Positive Electrode XI>

A binder solution was produced by mixing 0.35 g of a styrene-butadiene rubber (SBR) emulsion (TRD2001 manufactured by JSR Corporation) having a concentration of 48 wt % with 8.14 g of a polyacrylic acid aqueous solution (manufactured by Wako Pure Chemical Industries, Ltd., and having a weight average molecular weight of 1,000,000) having a concentration of 4.4 wt %, and adding thereto 6 g of ion-exchanged water. Then, after 4.5 g of the polyaniline powder in the reduced-dedoped state and 0.5 g of electrically conductive carbon black (DENKA BLACK manufactured by Denki Kagaku Kogyo K.K.) powder were mixed, the produced binder solution above was added thereto, and the resulting mixture was adequately kneaded by a spatula. The kneaded mixture was ultrasonically treated for 1 minute by an ultrasonic homogenizer, and then the mixture was subjected to mild dispersion by applying a high shear force with the use of a thin-film spin system high-speed mixer (FIL-MIX MODEL 40-40 manufactured by Primix Corporation) to provide a fluid paste. The paste was defoamed by means of a vacuum suction bell jar and a rotary pump. The defoamed paste was applied at a coating rate of 10 mm/sec onto an etched aluminum foil for an electric double layer capacitor (30CB manufactured by Hohsen Corporation) with the use of a desktop automatic coater (manufactured by Tester Sangyo Co., Ltd.) while the coating thickness was adjusted to 360 μm by a doctor blade applicator equipped with a micrometer. Then, the resulting coating was left standing at a room temperature for 45 minutes, and dried on a hot plate at a temperature of 100° C. to produce a polyaniline sheet electrode (positive electrode XI).

A weight energy density was measured according to the following criterion on each of the nonaqueous electrolyte secondary batteries of the inventive examples and the comparative examples thus obtained. The results of measurement are shown together in Table 3 below.

<<Measurement of Weight Energy Density>>

The nonaqueous electrolyte secondary batteries were each allowed to stand still in a thermostat chamber kept at 25° C. By means of a battery charge/discharge device (TOSCAT manufactured by TOYO SYSTEM CO., LTD.), measurement was performed in a constant current and constant voltage charge/constant current discharge mode. A charge process was performed at a constant current corresponding 0.05C until the voltage reached 3.8 V, and after the voltage reached 3.8 V, the charge process was performed at a constant voltage of 3.8 V until the current value decayed to 20% of a current value corresponding 0.05C. This charge process was defined as one charge process. Then, a discharge process was performed at a current value corresponding 0.05C until the voltage reached 2.0 V, and these processes were collectively defined as a charge/discharge cycle with a charge upper limit of 3.8 V.

Herein, 0.05C indicates a 20 hour rate, and the term "20 hour rate" means a current value at which it takes 20 hours to charge or discharge a battery. This charge/discharge cycle with a charge upper limit of 3.8 V was repeated five times to activate the cells. Then, a charge process was performed at a constant current corresponding 0.05C until the voltage reached 4.2 V, and after the voltage reached 4.2 V, the charge process was performed at a constant voltage of 4.2 V until the current value decayed to 20% of a current value corresponding 0.05C. This charge process was defined as one charge process. Then, a discharge process was performed at a current value corresponding 0.05C until the voltage reached 2.0 V, and these processes were collectively defined as one charge/discharge cycle with a charge upper limit of 4.2 V. The weight energy density relative to a net weight of the polyaniline was determined from the discharge capacity obtained at the third cycle of the charge/discharge cycle with a charge upper limit of 4.2 V.

TABLE 3

| | Electrically Conductive Polymer | Polyanion | Lithiation Percentage | Li/N in Molar Ratio | Separator | Weight Energy Density (mWh/g) |
|---|---|---|---|---|---|---|
| Example 1 | polyaniline | acrylic acid | 100% | 0.1 | three sheets of nonwoven fabrics | 291 |
| Example 2 | polyaniline | acrylic acid | 100% | 0.1 | two sheets of polypropylene | 280 |
| Example 3 | polyaniline | acrylic acid | 100% | 0.2 | three sheets of nonwoven fabrics | 389 |
| Example 4 | polyaniline | acrylic acid | 100% | 0.2 | two sheets of polypropylene | 343 |
| Example 5 | polyaniline | acrylic acid | 100% | 0.3 | three sheets of nonwoven fabrics | 436 |
| Example 6 | polyaniline | acrylic acid | 100% | 0.3 | two sheets of polypropylene | 380 |
| Example 7 | polyaniline | acrylic acid | 100% | 0.4 | three sheets of nonwoven fabrics | 517 |
| Example 8 | polyaniline | acrylic acid | 100% | 0.4 | two sheets of polypropylene | 494 |
| Example 9 | polyaniline | acrylic acid | 100% | 0.5 | three sheets of nonwoven fabrics | 479 |
| Example 10 | polyaniline | acrylic acid | 100% | 0.5 | two sheets of polypropylene | 463 |
| Example 11 | polyaniline | acrylic acid | 100% | 0.6 | three sheets of nonwoven fabrics | 444 |
| Example 12 | polyaniline | acrylic acid | 100% | 0.6 | two sheets of polypropylene | 393 |
| Example 13 | polyaniline | acrylic acid | 100% | 0.7 | three sheets of nonwoven fabrics | 303 |
| Example 14 | polyaniline | acrylic acid | 100% | 0.7 | two sheets of polypropylene | 292 |

TABLE 3-continued

| | Electrically Conductive Polymer | Polyanion | Lithiation Percentage | Li/N in Molar Ratio | Separator | Weight Energy Density (mWh/g) |
|---|---|---|---|---|---|---|
| Comparative Example 1 | polyaniline | — | — | 0 | three sheets of nonwoven fabrics | 232 |
| Comparative Example 2 | polyaniline | — | — | 0 | two sheets of polypropylene | 145 |
| Comparative Example 3 | polyaniline | acrylic acid | — | 0 | three sheets of nonwoven fabrics | 259 |

In the nonaqueous electrolyte secondary battery comprising the stacked component including the positive electrode, the negative electrode and the separator interposed therebetween, the electrolyte solution which can be involved in the charge/discharge reaction is considered to be an electrolyte solution existing in a gap portion between the positive electrode and the negative electrode. Most of the electrolyte solution exists in gap portions in the positive electrode and the negative electrode and in gap portions within the separator disposed between the positive electrode and the negative electrode. Therefore, it is possible to vary the amount of the electrolyte solution, which can be involved in the charge/discharge reaction, by using separators each having different porosity, or by changing the thickness or the number of sheets of a separator. In Table 3 above, the amount of the electrolyte solution involved in the charge/discharge reaction in the case where three sheets of nonwoven fabrics were used is greater than that in the case where two sheets of polypropylene porous membranes were used.

From a comparison between the inventive examples and the comparative examples in Table 3 above, it is found that the nonaqueous electrolyte secondary batteries of the inventive examples each having a positive electrode containing polyanion evidently have a discharge weight energy density higher than the nonaqueous electrolyte secondary batteries of the comparative examples. Further, in the inventive examples, since the positive electrode contains lithium, a reduction of a discharge capacity is suppressed as compared with the nonaqueous electrolyte secondary batteries of the comparative examples in which the positive electrode does not contain lithium when the amount of the electrolyte solution involved in the charge/discharge reaction is reduced due to change of the separator. That is, dependency of the discharge capacity on the electrolyte solution amount is lowered. From the above, the nonaqueous electrolyte secondary battery of the present invention is found to be a nonaqueous electrolyte secondary battery in which a reduction in weight energy density per volume as a whole cell is suppressed.

While specific forms of the embodiment of the present invention have been shown in the aforementioned inventive examples, the inventive examples are merely illustrative of the invention but not limitative of the invention. It is contemplated that various modifications apparent to those skilled in the art could be made within the scope of the invention.

The nonaqueous electrolyte secondary battery of the present invention can be advantageously used as a nonaqueous electrolyte secondary battery such as a lithium-ion secondary battery. The nonaqueous electrolyte secondary battery of the present invention can be used for the same applications as the conventional secondary batteries, for example, for mobile electronic apparatuses such as mobile PCs, mobile phones and personal data assistants (PDAs), and for driving power sources for hybrid electric cars, electric cars and fuel battery cars.

What is claimed is:

1. A nonaqueous electrolyte secondary battery comprising:
   a positive electrode,
   a negative electrode,
   a separator disposed between the positive electrode and the negative electrode, and
   an electrolyte solution containing a supporting salt having ionic conductivity,
   wherein the positive electrode comprises a composition containing components (a) and (b) below and satisfying a requirement ($\alpha$) below, and
   wherein the negative electrode contains metal lithium and at least one selected from materials capable of lithium ion insertion/desertion:
   (a) an electrically conductive polymer selected from the group consisting of polyacetylene, polypyrrole, polyaniline, polythiophene, polyfuran, polyselenophene, polyisothianaphthene, polyphenylene sulfide, polyphenylene oxide, polyazulene, poly(3,4-ethylenedioxythiophene) and various derivatives thereof;
   (b) at least one lithium salt formed by substituting a part of a polyanionic acid with lithium selected from the group consisting of polyacrylic acid, polymethacrylic acid, polyvinylbenzoic acid, polyallylbenzoic acid, polymethallylbenzoic acid, polymaleic acid, polyfumaric acid and polyglutamic acid; and
   ($\alpha$) a molar ratio of a lithium element content in the component (b) to a content of an element involved in a charge/discharge reaction in the component (a) is 0.1 to 0.6.

2. The nonaqueous electrolyte secondary battery according to claim 1, wherein the electrically conductive polymer (a) is at least one selected from polyaniline and polyaniline derivatives.

3. The nonaqueous electrolyte secondary battery according to claim 1, wherein the molar ratio of the lithium element content in the lithium salt (b) to the content of the element involved in the charge/discharge reaction in the electrically conductive polymer (a) is 0.3 to 0.6.

4. The nonaqueous electrolyte secondary battery according to claim 1, wherein the element involved in the charge/discharge reaction in the electrically conductive polymer (a) is at least one selected from a nitrogen element and a sulfur element.

5. A method for manufacturing the nonaqueous electrolyte secondary battery according to claim 1, the method comprising steps (I) to (III) below:
   (I) preparing,
   a positive electrode comprising a composition containing components (a) and (b) below and satisfying a requirement ($\alpha$) below and a negative electrode containing metal lithium and at least one selected from materials capable of lithium ion insertion/desertion, and disposing a separator between the positive electrode and the negative electrode to produce a stacked component including the positive electrode, the separator and the negative electrode;

(a) an electrically conductive polymer selected from the group consisting of polyacetylene, polypyrrole, polyaniline, polythiophene, polyfuran, polyselenophene, polyisothianaphthene, polyphenylene sulfide, polyphenylene oxide, polyazulene, poly(3,4-ethylenedioxythiophene) and various derivatives thereof;

(b) at least one lithium salt formed by substituting a part of a polyanionic acid with lithium selected from the group consisting of polyacrylic acid, polymethacrylic acid, polyvinylbenzoic acid, polyallylbenzoic acid, polymethallylbenzoic acid, polymaleic acid, polyfumaric acid and polyglutamic acid; and ($\alpha$) a molar ratio of a lithium element content in the component (b) to a content of an element involved in a charge/discharge reaction in the component (a) is 0.1 to 0.6;

(II) housing at least one of the stacked component in a battery container; and (III) pouring an electrolyte solution into the battery container.

* * * * *